(12) United States Patent
Sugawara

(10) Patent No.: US 6,971,599 B2
(45) Date of Patent: Dec. 6, 2005

(54) SPINNING REEL ROTOR BRAKING DEVICE

(75) Inventor: Ken'ichi Sugawara, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/851,102

(22) Filed: May 24, 2004

(65) Prior Publication Data
US 2004/0251361 A1 Dec. 16, 2004

(30) Foreign Application Priority Data
Jun. 13, 2003 (JP) .............................. 2003-168744

(51) Int. Cl.⁷ .......................................... A01K 89/02
(52) U.S. Cl. ................................................... 242/231
(58) Field of Search ............................... 242/230–232

(56) References Cited

U.S. PATENT DOCUMENTS

| 4,238,085 | A | * | 12/1980 | Jansson et al. | ............. 242/282 |
| 4,337,905 | A | * | 7/1982 | Sazaki | ............. 242/232 |
| 6,382,542 | B1 | * | 5/2002 | Sato | ............. 242/243 |
| 6,609,670 | B2 | * | 8/2003 | Sato | ............. 242/231 |
| 6,729,568 | B2 | * | 5/2004 | Hirayama et al. | ............. 242/232 |

FOREIGN PATENT DOCUMENTS

JP         10-4839 A         1/1998

* cited by examiner

Primary Examiner—Emmanuel M Marcelo
(74) Attorney, Agent, or Firm—Shinjyu Global IP Counselors, LLP

(57) ABSTRACT

A spinning reel rotor braking device has a moving member, a braking member, and a restriction mechanism. The moving member is provided on the rotor and movable between a first position and a second position as the bail arm moves. The braking member is mounted on the mounting groove of the reel unit, and has a drag portion that generates a braking force by frictionally sliding against the moving member when the moving member is in the second position. The restriction mechanism is formed on an inner periphery of the braking member and on an outer periphery of the mounting groove, and restricts backward movement of the braking member relative to the reel unit so that the braking member does not come into contact with a rear end portion of the mounting groove. With the present invention, the braking force of the rotor braking device can be stabilized.

22 Claims, 13 Drawing Sheets

SPINNING REEL ROTOR BRAKING DEVICE

BACKGROUND OF THE INVENTION

1. Field of the Invention

The present invention generally relates to a rotor braking device. More specifically, the present invention relates to a spinning reel rotor braking device for a spinning reel that brakes a rotor rotatably mounted on a reel unit of the spinning reel in response to the pivoting of a bail arm that pivots between a line-winding posture and a line-releasing posture.

2. Background Information

A rotor on a spinning reel is generally provided with a bail arm for guiding fishing line to a spool. The bail arm can assume a line-winding posture, in which the fishing line is guided to the circumference of the spool when winding up the fishing line, and a line-releasing posture, in which the bail arm is toppled over from the line-winding posture so that it does not pose a hindrance when the fishing line is rolled off from the spool. The rotor is provided with a bail tripping device, which maintains the bail arm in the line-winding posture and the line-releasing posture and returns the bail arm from the line-releasing posture to the line-winding posture in cooperation with the rotation of the rotor in the line-winding direction (see, for example, Japanese Patent Application Publication H10-4839).

A conventional bail tripping device, for example, includes a toggle spring mounted to the rotor and whose front end is interlocked with the bail arm in the vicinity of its pivot center, a rod-shaped moving member having front end that is interlocked with the bail arm in the vicinity of its pivot center and a base end that moves back and forth with respect to the reel unit, and a switching projection provided on the reel unit so as to contact the moving member. The toggle spring toggles and urges the bail arm between the two postures, and maintains the bail arm in one of the two postures. When the bail arm is pivoted into the line-releasing posture, the moving member retreats to a position in which it contacts the switching projection. Then, when the rotor rotates in the line-winding direction, the rotor pushes the switching projection forward, the toggle spring contracts due to this forward advancement, and the toggle spring returns the bail arm to the line-winding posture.

A spinning reel having improved rotational transmission efficiency can be rotated easily in the line-winding direction. When the rotor rotates, its rotational phase tends to be misaligned easily, even when the rotor has been rotated into a rotational phase suitable for casting or thumbing.

In the aforementioned conventional configuration, a braking member that contacts the reel unit and brakes the rotor is mounted on the moving member so as to prevent the rotation of the rotor in the line-releasing posture. When the moving member is moved into the contact position, the braking member contacts the front surface of the reel unit and is compressed, thus braking the rotor. When the rotor is elastically braked like this when the bail is tripped, the rotor can be prevented from rotating and can also be rotated in the line-winding direction when necessary.

In the aforementioned conventional configuration, the braking member mounted on the moving member comes into contact with the reel unit and is compressed, thus braking the rotor. Therefore, if the contact position of the moving member varies in the front to back direction due to manufacturing errors or assembly errors, the amount of compression of the braking member will change as well. If the amount of compression changes, the braking force on the rotor will also change, and thus the rotor cannot be braked reliably. Accordingly, others have considered mounting an annular braking member made of an elastic synthetic resin onto the reel unit, and moving the moving member in a direction perpendicular to the compression direction of the braking member from the end of the braking member towards an outer circumferential surface, to thereby bring the moving member into contact with the braking member.

However, there are concerns that this configuration will produce irregularities in the braking force and make the braking force unstable because braking force is generated by only one portion in which the moving member contacts the braking member. If the braking force becomes unstable, there are concerns that a consistent amount of braking force will not be produced, which in turn will give rise to a decrease in operability.

To solve this problem, others have considered providing an annular drag portion that is made of an elastic synthetic resin and frictionally engages with the reel unit so as to rotate relative thereto, and a braking member that includes a plurality of engaging portions with which a protrusion on the moving member engages, so that the drag portion can frictionally engage with the reel unit when the protrusion on the moving member engages with the engaging portions. With this configuration, the braking force can be stabilized because the rotor is uniformly braked by the entire drag portion.

This type of braking member is made of an elastic synthetic resin and the drag portion is mounted to a mounting groove formed on the outer periphery of the front end of the reel unit, so that the drag portion can frictionally engage with the reel unit. The reel unit further includes a body portion having a side opening for mounting various mechanisms in the interior thereof, and a lid member for closing the opening of the body portion. Here, a joint between the body portion and the lid member is exposed toward the front at a flange portion that is on the front end of the reel unit, i.e., on the rear end of the mounting groove. With this type of reel unit, for example, a very small stepped portion is formed at the joint between the body portion and the lid member due to manufacturing errors and the like, and thus the braking member may come into contact with the stepped portion. When the braking member comes into contact with the very small stepped portion formed on the joint, the braking member may be moved or the braking force may be changed by the frontward force that the very small stepped portion creates, and thus it may become difficult to obtain a predetermined braking force.

In view of the above, it will be apparent to those skilled in the art from this disclosure that there exists a need for an improved spinning reel rotor braking device that overcomes the above-discussed problems of the conventional art. This invention addresses this need in the art as well as other needs, which will become apparent to those skilled in the art from this disclosure.

SUMMARY OF THE INVENTION

A purpose of the present invention is to stabilize the braking force of a rotor braking device in a spinning reel.

A rotor braking device for a spinning reel according to the first aspect of the present invention is for braking a rotor that is rotatably mounted on a reel unit in accordance with a pivot of a bail arm that is pivotable between a line-winding posture and a line releasing posture. The reel unit has a mounting groove on an outer periphery of a front end portion thereof. The rotor braking device includes a moving member, a braking member, and a restriction mechanism. The braking member is mounted on the mounting groove of the reel unit. The braking member has a drag portion that generates a braking force by frictionally sliding against one of the reel unit and the protruding portion of the moving member when the moving member is in the second position. The restriction mechanism that is formed on an inner periphery of the braking member and on an outer periphery of the mounting groove. The restriction mechanism restricts backward movement of the braking member relative to the reel unit so that the braking member does not come into contact with a rear end portion of the mounting groove.

This rotor braking device has a restriction mechanism that restricts the backward movement of the braking member so that the braking member does not come into contact with the rear end of the mounting groove. Here, because the restriction mechanism protects the braking member from coming into contact with the rear end of the mounting groove, even if a very small stepped portion is formed on the rear end portion of the mounting groove, it will be difficult for the braking member to come into contact with the very small stepped portion. Accordingly, a predetermined braking force can be obtained and thus the braking force can be stabilized because the braking member will no longer move and the braking force will no longer change.

The rotor braking device of the spinning reel according to the second aspect of the present invention is the device disclosed in the first aspect of the present invention, in which the braking member further includes an engaging portion that unrotatably engages with the protruding portion of the moving member when the moving member is moved to the second position. The drag portion frictionally slides against the mounting groove of the reel unit when the protruding portion of the moving member engages with the engaging portions. Here, because the drag portion rotatably and frictionally engages with the mounting groove, the rotor is not braked only on one portion as in the prior art, but is uniformly braked over the entire drag portion, and thus the braking force can be stabilized.

The rotor braking device of the spinning reel according to the third aspect of the present invention is the device disclosed in the second aspect of the present invention, in which the engaging portion includes a plurality of concavities formed on an outer periphery of the braking member. Thus, braking force can be reliably obtained from the protruding portion engaging the concavity formed on the outer peripheral surface of the mounting groove, and the drag portion formed on the inner peripheral surface of the braking member sliding against the mounting groove.

The rotor braking device of the spinning reel according to the fourth aspect of the present invention is the device disclosed in the third aspect of the present invention, in which the braking member further includes a tapered portion that includes an oblique surface to guide the protruding portion to the engaging portion.

The rotor braking device of the spinning reel according to the fifth aspect of the present invention is the device disclosed in the first aspect of the present invention, in which the drag portion frictionally slides against the protruding portion of the moving member when the moving member is in the second position. Here, because the protruding portion of the moving member directly contacts the drag portion, a braking force can be easily obtained and the structure of the braking member can be simplified.

The rotor braking device of the spinning reel according to the sixth aspect of the present invention is the device disclosed in any of the first through fifth aspects of the present invention, in which the braking member includes a first annular portion that is formed on the front side thereof, and a second annular portion that is formed on the rear side thereof having a larger diameter than that of the first annular portion. Here, because the cross-section of the braking member is formed to become substantially L-shaped, the protruding portion on the moving member can reliably come into contact with the second annular portion formed on the rear side of the braking member having a larger diameter than the first annular portion on the front side thereof.

The rotor braking device of the spinning reel according to the seventh aspect of the present invention is the device disclosed in any of the first through sixth aspects of the present invention, in which the restriction mechanism includes an interlocking groove that is formed on the inner periphery of the braking member, and an interlocking protrusion that is formed on the outer periphery of the mounting groove and capable of interlocking with the interlocking groove. Here, by interlocking the interlocking protrusion of the mounting groove with the interlocking groove of the braking member, rearward movement of the braking member can be restricted.

The rotor braking device of the spinning reel according to the eighth aspect of the present invention is the device disclosed in any of the first through sixth aspects of the present invention, in which the restriction mechanism includes an interlocking protrusion that is formed on the inner periphery of the braking member, and an interlocking groove that is formed on the outer periphery of the mounting groove and capable of interlocking with the interlocking protrusion. Here, by interlocking the interlocking protrusion of the braking member with the interlocking groove of the mounting groove, rearward movement of the braking member can be restricted.

The rotor braking device of the spinning reel according to the ninth aspect of the present invention is the device disclosed in the sixth aspect of the present invention, in which the drag portion is formed at the second annular portion and frictionally slides against the protruding portion of the moving member when the moving member is in the second position.

The rotor braking device of the spinning reel according to the tenth aspect of the present invention is the device disclosed in any of the first through ninth aspects of the present invention, further including a spring member. The braking member has a groove formed on its outer periphery, such that the spring member is mounted to the groove of the braking member.

The rotor braking device of the spinning reel according to the eleventh aspect of the present invention is the device disclosed in the tenth aspect of the present invention, in which braking member has two semi-circular braking member components.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
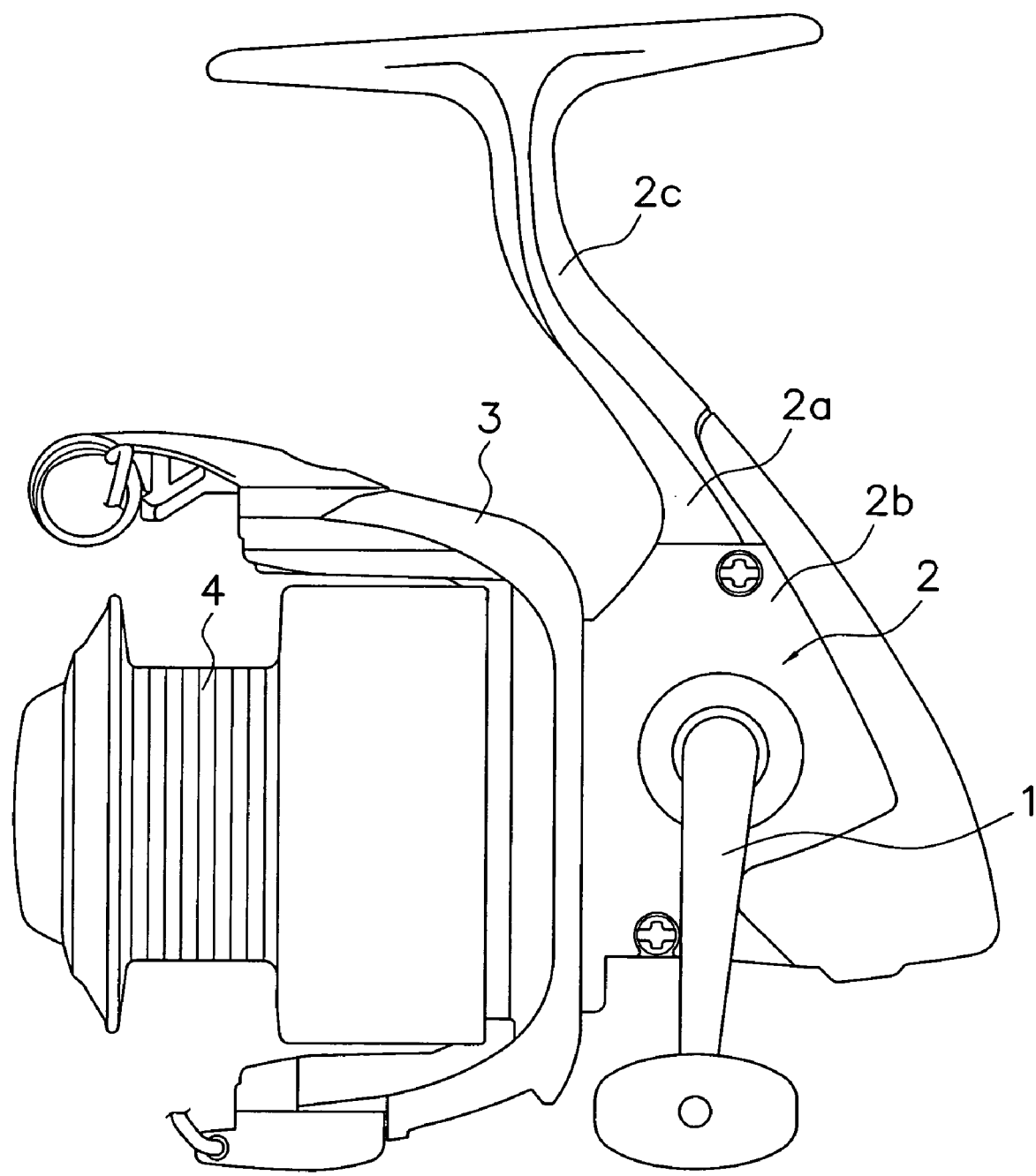
FIG. 1 is a left lateral view of a spinning reel in accordance with an embodiment of the present invention.
Figure 2:
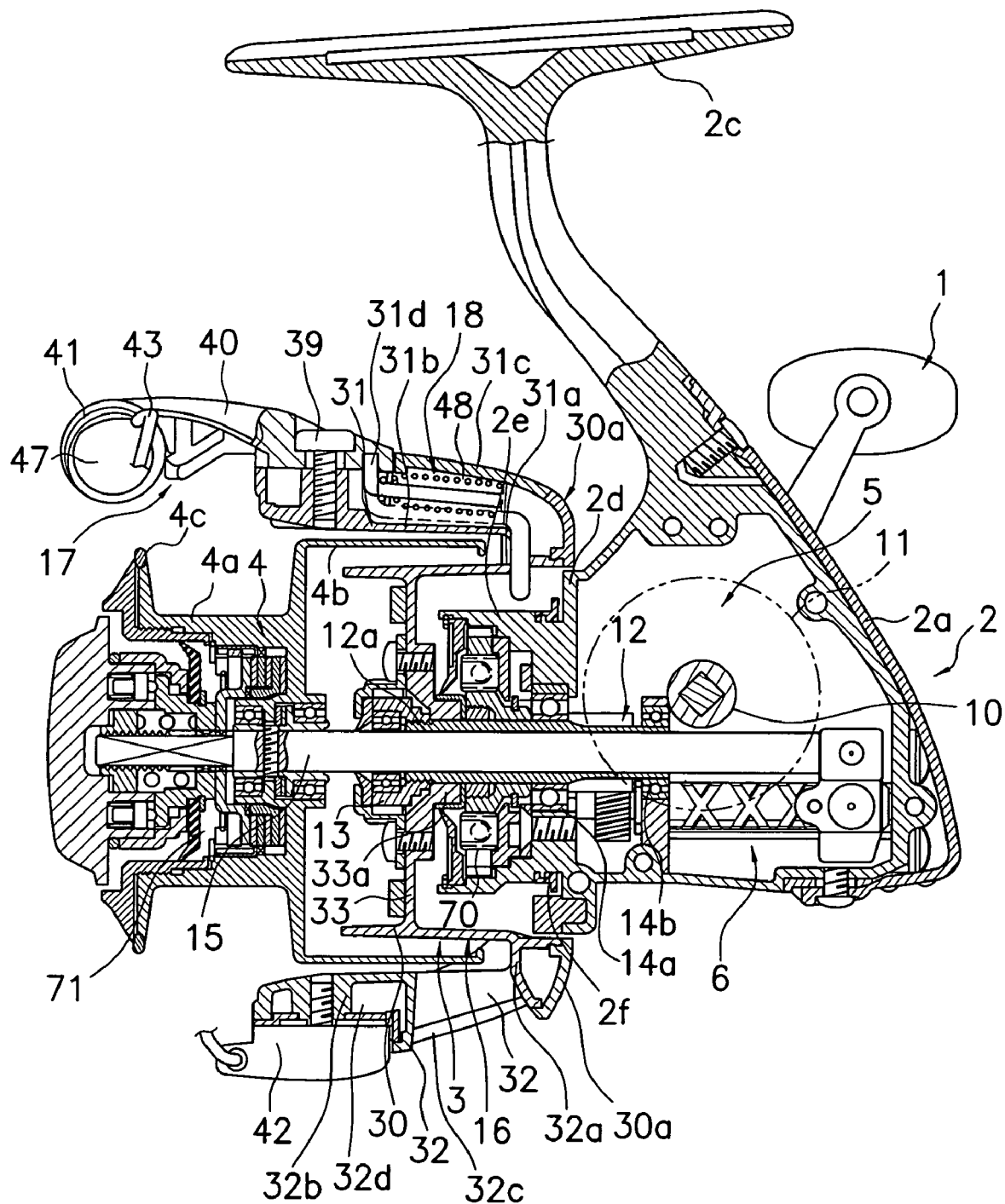
FIG. 2 is a left side cross-sectional view of the spinning reel in accordance with the embodiment of the present invention.

As shown in FIGS. 1 and 2, a spinning reel in which an embodiment of the present invention is applied includes a handle 1, a reel unit 2 that rotatably supports the handle 1, a rotor 3, and a spool 4. The rotor 3 is rotatively supported on the front of the reel unit 2. The spool 4 is for winding fishing line around the outer peripheral surface, and is arranged at the front end of the rotor 3 so that it can be shifted back and forth. Note that the handle 1 is mounted on the left side of the reel unit 2 in FIG. 1, and on the right side thereof in FIG. 2. Thus, the handle 1 can be mounted on either the left or the right side of the reel body 2.

The reel unit 2 includes a reel body 2a having a space in the interior thereof, and a lid member 2b (see FIG. 1) mounted detachably to the reel body 2a that serves to enclose the space in the interior of the reel body 2a.

The reel body 2a is made, for example, of an aluminum alloy, and is formed integrally with a T-shaped rod attachment leg 2c on the top of the reel body 2a that extends horizontally. As shown in FIG. 2, the space in the reel body 2a accommodates a rotor driving mechanism 5 for transmitting the rotation of the handle 1 to rotate the rotor 3, and an oscillation mechanism 6 for winding up fishing line uniformly by shifting the spool 4 back and forth. A circular flange portion 2d and a cylindrical portion 2e are formed on the front end of the reel body 2a and the lid member 2b. The cylindrical portion 2e is open to the front and its diameter is smaller than that of the flange portion 2d. As shown in FIG. 2, a mounting groove 2f is formed on the cylindrical portion 2e so that a rear end portion 2f1 of the mounting groove 2f having a D-shaped cross-section will become the front end portion of the flange portion 2d.

Figure 5:
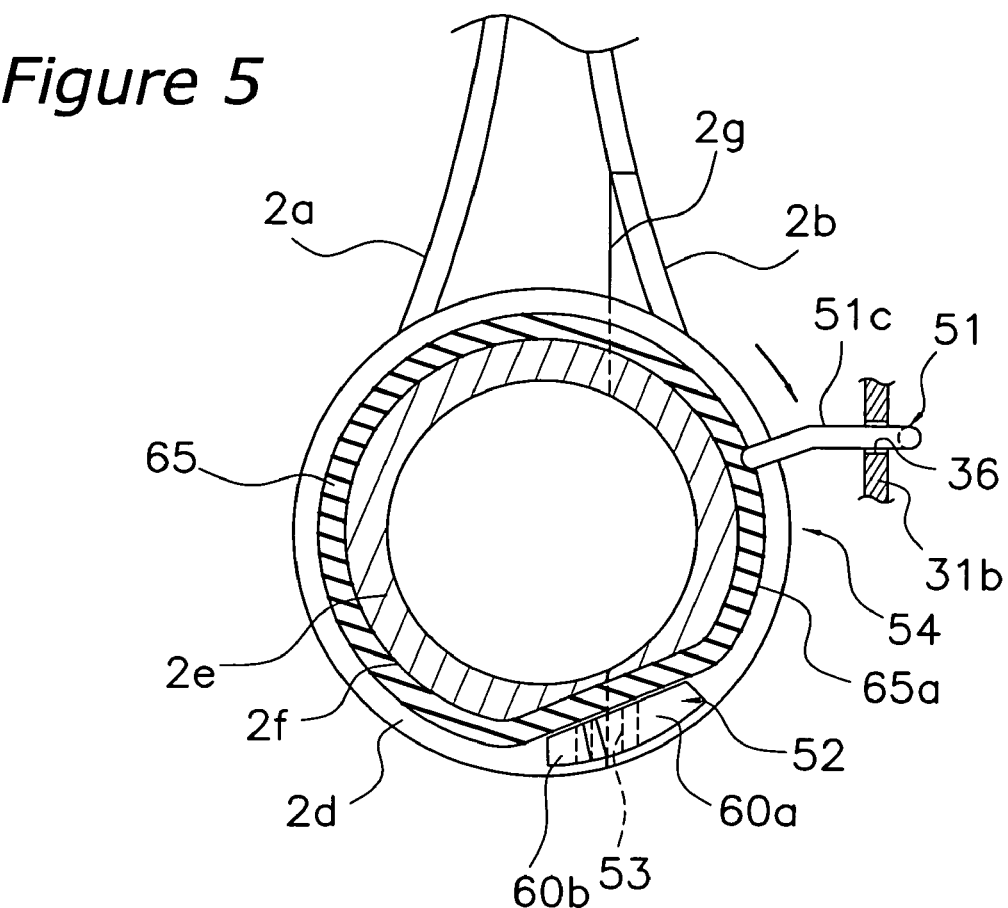
FIG. 5 is a front view of the reel body that shows the bail tripping mechanism of the spinning reel in accordance with the embodiment of the present invention.
Figure 6:
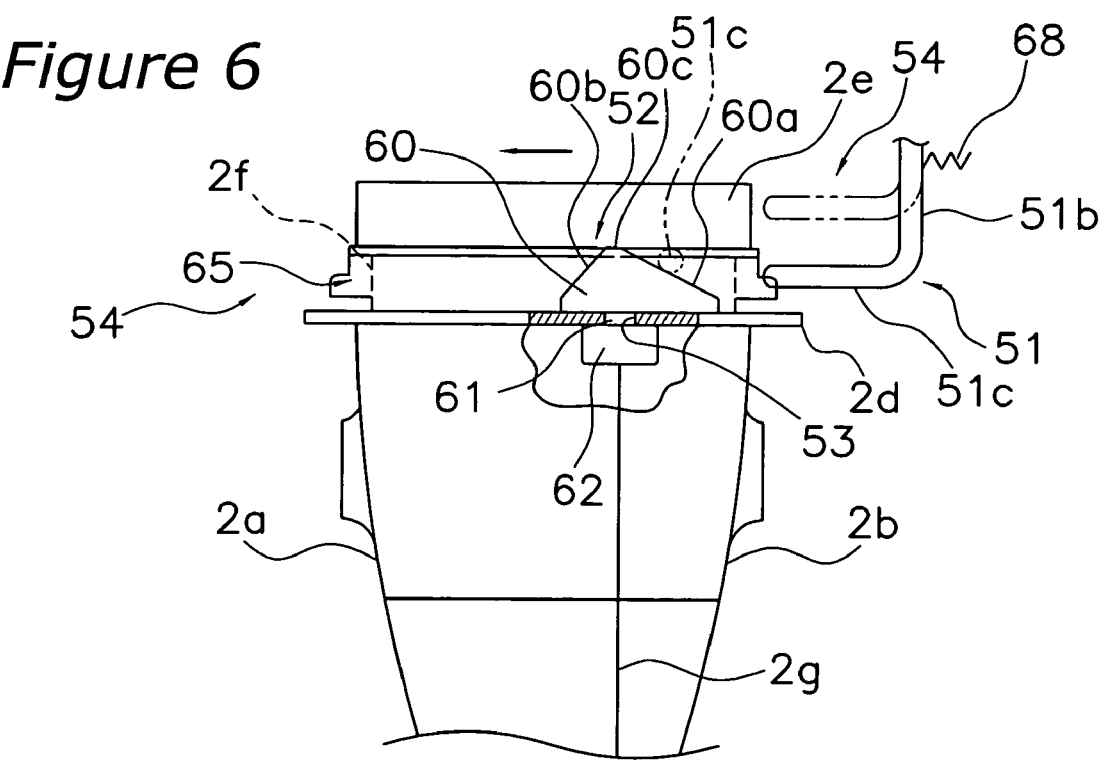
FIG. 6 is a partial bottom view of the reel body showing the bail tripping mechanism of the spinning reel in accordance with the embodiment of the present invention.

The lid member 2b is made, for example, of an aluminum alloy, and for example, is screwed at three locations to the reel body 2a. As shown in FIGS. 5 and 6, a later-described switching member 52 is mounted detachably to the flange portion 2d at the portion where the reel body 2a and the lid member 2b can be separated.

As shown in FIG. 2, the rotor drive mechanism 5 includes a handle shaft 10, a main gear 11 and a pinion gear 12. The main gear 11 rotates together with the handle shaft 10, on which the handle 1 is mounted non-rotatively. The pinion gear 12 meshes with the main gear 11. The pinion gear 12 is tubular, and its front portion 12a passes through the center of the rotor 3 and is fixed to the rotor 3 via a nut 13. The middle and the rear end portions of the pinion gear 12 are rotatively supported by the reel unit 2 via bearings 14a, 14b, respectively.

The oscillating mechanism 6 shifts the spool 4 back and forth by shifting a spool shaft 15 that is coupled to the center of the spool 4 via a drag mechanism 71 back and forth.

As shown in FIG. 2, the rotor 3 includes a rotor unit 16, a bail arm 17 that is mounted on the front end of the rotor unit 16 and pivotable between a line-releasing posture and a line-winding posture, and a bail tripping device 18 that is mounted to the rotor unit 16 and serves to return the bail arm 17 from the line-releasing posture to the line-winding posture.

The rotor unit 16 includes a cylindrical portion 30 that is mounted to the reel body 2a so that it can rotate freely around the spool shaft 15, and a first rotor arm 31 and a second rotor arm 32 that are arranged opposite one another on the sides of the cylindrical portion 30. The cylindrical portion 30, the first rotor arm 31 and the second rotor arm 32 are made of, for example, an aluminum alloy and unitarily formed.

A front wall 33 is formed at the front part of the cylindrical portion 30, and a boss 33a is formed in the center of the front wall 33. A through hole is formed in the center of the boss portion 33a, and a front portion 12a of the pinion gear and the spool shaft 15 pass through this through hole. A nut 13 is provided for fixing the rotor 3 on the front part of the front wall 33. A rear surface of the cylindrical portion 30 is covered by a third cover member 30a.

Figure 3A:
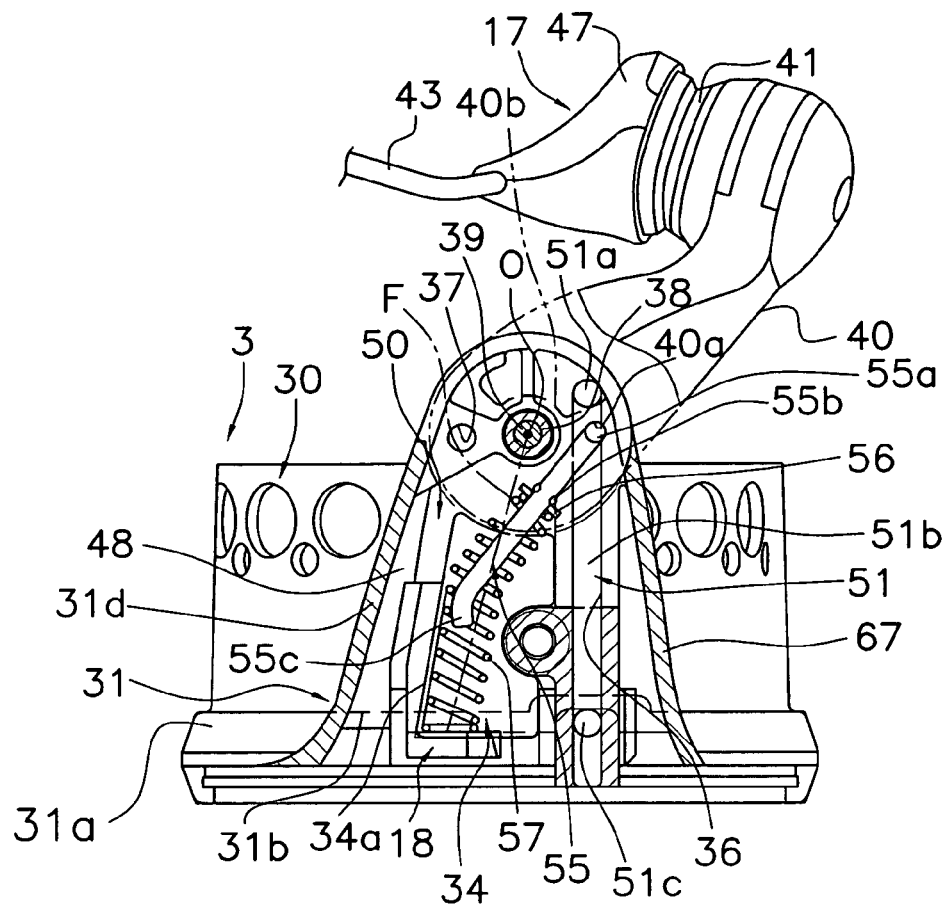
FIG. 3 is a plan view of the first rotor arm of the spinning reel of the spinning reel in accordance with the embodiment of the present invention.
Figure 3B:
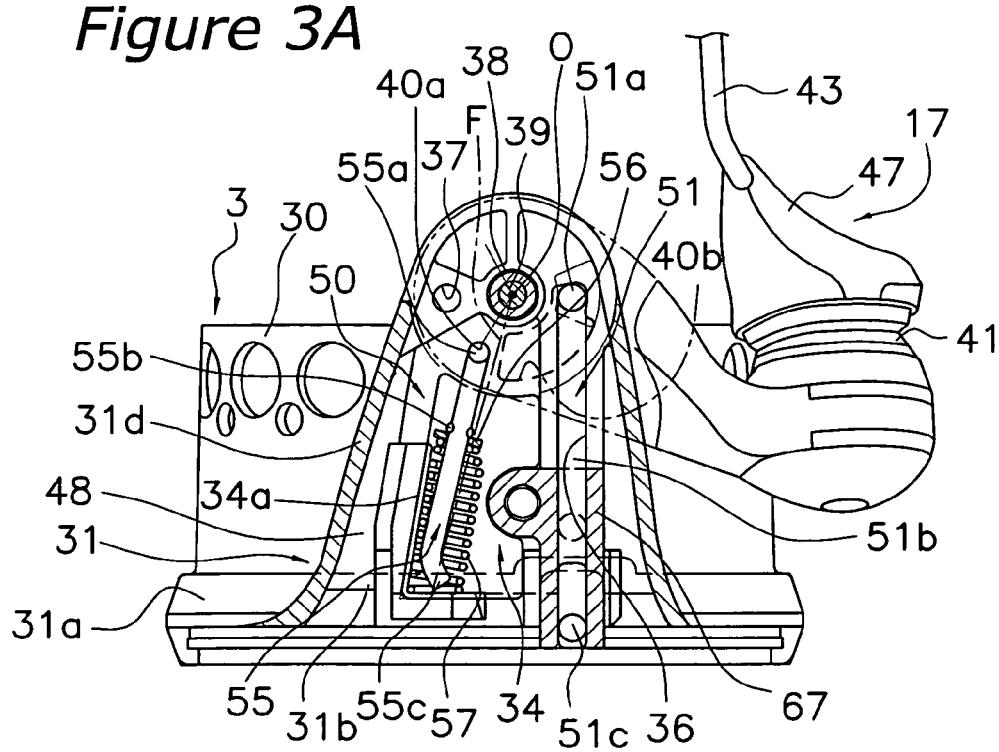
Figure 4:
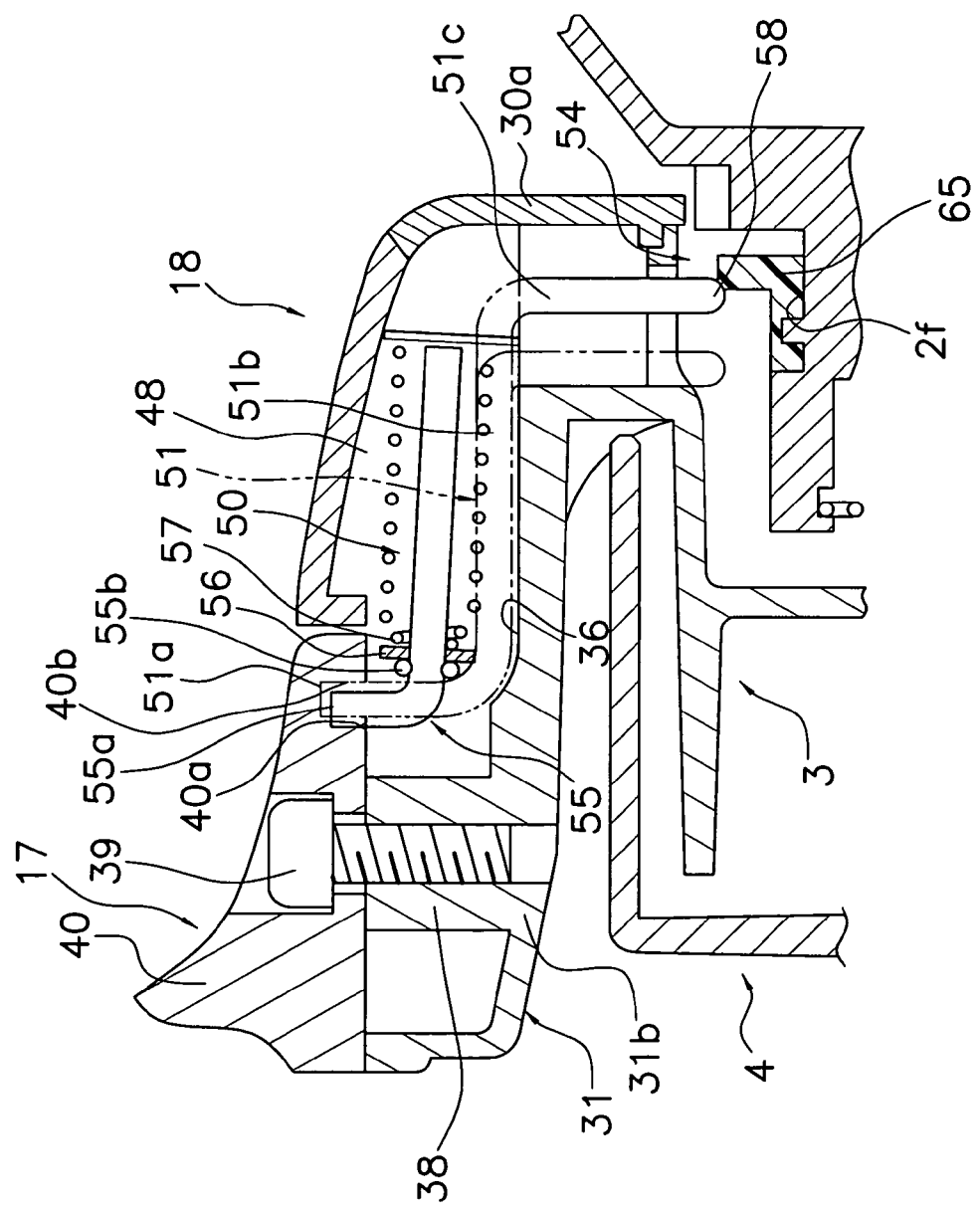
FIG. 4 is an enlarged cross-sectional view of the first rotor arm of the spinning reel in accordance with the embodiment of the present invention.

As shown in FIGS. 2 to 4, the first and second rotor arms 31 and 32 respectively include first and second connection portions 31a and 32a arranged on the outer peripheral surface of the rear portion of the cylindrical portion 30, first and second arm portions 31b and 32b that curve outward and extend forward from the first and second connection portions 31a and 32a, and first and second cover members 31c and 32c that cover the outer portions of both the two connection portions 31a and 32a and the two arm portions 31b and 32b. The first and second connection portions 31a and 32a are each formed in smooth continuity with the cylindrical portion 30 in the circumferential direction.

The first and second arm portions 31b, 32b are formed in smooth continuity with the first and second connection portions 31a, 32a, and extend frontward spaced apart from the cylindrical portion 30. The first and second arm portions 31b and 32b form a smooth curve from their tips to the portions where they are connected to the cylindrical portion 30. Apertures 31d, 32d are respectively formed in outer portions of both the two connection portions 31a and 32a and the two arm portions 31b and 32b, and the first and second cover members 31c, 32c respectively close the apertures 31d, 32d from outside. An accommodation space 48 is formed between the first cover member 31c, the first connection portion 31a, and the first arm portion 31b.

A first bail support member 40 is pivotably mounted to the outer peripheral side of the front end of the first arm portion 31b. As shown in FIGS. 3 and 4, a long and narrow guide groove 36 that serves to guide a later-described moving member 51 of the bail tripping mechanism 18, a mounting hole 37 to which a timing mechanism 75 (see FIG. 8) for conferring resistance to the bail arm 17 is mounted, and a boss 38 having a screw hole therein for pivotably mounting the first bail support member 40, are formed on the first arm portion 31b. A second bail support member 42 is pivotably mounted to the outer peripheral side of the front end of the second rotor arm 32b.

The first bail support member 40 is attached to the first rotor arm 31b by a threaded attachment pin 39 that is screwed into the boss 38 of the first arm 31b. The attachment pin 39 is a bolt with a hexagonal hole having few snags, and thus it is difficult for fishing line to get caught at the head thereof.

As shown in FIG. 3, a line roller 41 for guiding fishing line to the spool 4, and a fixed shaft cover 47 that is fixed to the first bail support member 40, are mounted on the front end of the first bail support member 40, with the line roller 41 being arranged between the first bail support member 40 and the fixed shaft cover 47. The line roller 41 is mounted rotatively to the front end of the first bail support member 40. The fixed shaft cover 47 has a deformed cone shape with a pointed tip. A bail 43 formed by bending a wire into an approximate U-shape is fixedly held between the front ends of the fixed shaft cover 47 and the second bail support member 42. The first and second bail support members 40 and 42, the line roller 41, the bail 43, and the fixed shaft cover 47 form the bail arm 17 for guiding the fishing line to the spool 4. The bail arm 17 can pivot between a line-winding posture shown in FIG. 3(a) and a line-releasing posture shown in FIG. 3(b), which is a posture flipped from the line-winding posture.

The bail-tripping mechanism 18 is disposed within the accommodation space 48 in the first rotor arm 31. The bail tripping mechanism 18 restores the bail arm 17 from the line-releasing posture to the line-winding posture in cooperation with the rotation of the rotor 3 and maintains the bail arm 17 in one of these two postures.

As shown in FIGS. 3 to 6, the bail tripping mechanism 18 includes a toggle spring mechanism 50 mounted within the accommodation space 48 and pivotably mounted to the first arm portion 31b, a moving member 51 mounted within the accommodation space 48 so that it is movable approximately back and forth, a switching member 52 mounted detachably on a flange portion 2d so that it can contact the moving member 51, a rotor braking device 54 that has a braking member 65 for braking the rotor 3, and a timing mechanism 75 that restricts the bail arm 17 from returning to the line-winding posture when in the line-releasing posture.

As shown in FIG. 3, the toggle spring mechanism 50 is arranged inside the first rotor arm 31 so that it can take a first position in which the bail arm 17 is in the line-winding posture and a second position in which the bail arm 17 is in the line-releasing posture. The toggle spring mechanism 50 serves as a mechanism for maintaining the bail arm 17 in the line-winding posture or the line-releasing posture. The toggle spring mechanism 50 includes a rod 55 and a coil spring 57. One end of the rod 55 is interlocked with the first bail support member 40 and the other end extends along the first arm portion 31b. The coil spring 57 urges the rod 55 outward.

As shown in FIG. 4, the front end of the rod 55 has an interlocking portion 55a that is bent over towards the first bail support member 40 so as to interlock with an engagement hole 40a of the first bail support member 40. The rod 55 also includes an interlocking protrusion 55b in its intermediate position for interlocking with the front end of the coil spring 57, and a bent portion 55c on its rear end that is bent slightly. A washer 56 against which the front end of the coil spring 57 abuts is mounted to the interlocking protrusion 55b, and thus power from the front end of the coil spring 57 is uniformly transmitted to the rod 55. The rod 55 is disposed in a titled manner such that the rear portion thereof is positioned radially inward.

The coil spring 57 is guided by contacting a guiding sheet 34 made of a synthetic resin such as a polyamide resin that is mounted to the first arm portion 31b. The guide sheet 34 includes a wall portion 34a that is bent so that it guides one side surface of the coil spring 57 and interlocks with the base end thereof. The wall portion 34a has a height that allows it to contact the lateral portion and the base end of the coil spring 57. The coil spring 57 is arranged so as to slope radially inward toward the rear.

The front end of the coil spring 57 with which the washer 56 interlocks has a smaller coil diameter than the other portions thereof. Thus, at the other portions besides the front end, the coil spring 57 is not easily deformed even when a large gap is created between the coil spring 57 and the rod 55, and it is not easy for the rod 55 to change its posture inside the coil spring 57. Note that it is also possible to interlock the base portion of the coil spring 57 by providing a cover portion or the like that covers a boss portion and/or an outer peripheral surface of the boss portion, the boss portion contacting the inner peripheral surface of the base portion of the coil spring 57. Furthermore, it is also possible to mount the boss portion and cover portion to the first arm portion 31b, so that they are pivotable around an axis parallel to the pivot axis of the first bail support member 40. For example, it is conceivable that a circular arc-shaped protrusion is formed on the base end surface of the boss portion, and a circular arc-shaped recess engaging the circular arc-shaped protrusion is formed inside the first arm portion 31b, whereby the boss portion is pivotable.

The toggle spring mechanism 50 in this manner is arranged so that the positions at which the rod 55 is engaged with the first bail support member 40 in the line-winding posture and the line-releasing posture are different with respect to a line segment F. The line segment F connects the coil spring 57 which is the axis of the pivot shaft, the central position of the base end, and the pivot axis O of the first bail support member 40 (the axis of the attachment pin 39). A dead point of the toggle spring mechanism 50 (the position at which the coil spring 57 is most compressed) is a position lying on the line segment F. Thus, the toggle spring mechanism 50 can toggle the bail arm 17 between the two postures that are on opposite sides of the dead point, can bias the bail arm 17 toward both postures, and can maintain the bail arm 17 in both postures. The dead point of the toggle spring mechanism 50 is shifted toward the line-releasing posture side.

The shifting member 51 is, for example, a wire made of metal such as stainless steel, and its two ends are bent to 90 degree angles which point in different directions. The moving member 51 is mounted on the first arm portion 31b such that it can be moved approximately back and forth between a first position (withdrawn position) shown in FIG. 3(a) and a second position (contact position) shown in FIG. 3(b). As shown in FIGS. 3 to 6, a front end portion 51a of the moving member 51 is bent outward, and interlocked with a fan shaped engagement groove 40b formed on the first bail support member 40. A central portion 51b extends along the first arm portion 31b radially inward of the rod 55.

A rear end portion 51c passes through a guide groove 36, extends inward to a position where it slightly overlaps the front end surface of the braking member 65 that forms the rotor braking device 54 has a rear end surface that is slightly rounded. The width of the guide groove 36 is approximately the same as the diameter of the moving member 51. Therefore, the inner side in the radial direction of the central portion 51b of the moving member 51 is guided back and forth along the guide groove 36 as the bail arm 17 pivots.

When the bail arm 17 is in the line-releasing posture, the engaging end of the moving member 51 that interlocks with the engagement groove 40b is positioned further toward the line-winding posture side than a line connecting the rear end portion 51c and the pivot center of the bail arm 17. That is to say, the moving member 51 is positioned so that in both the first position (withdrawn position) and the second position (contact position), the location where the moving member 51 is interlocked with the first bail support member 40 is on the same side relative to the line connecting the axis of the rear end portion 51c in the contact position (FIG. 3b) with the pivot axis of the first bail support member 40. Thus, when the switching member 52 presses against the rear end portion 51c of the moving member 51, the first bail support member 40 can be restored to the line-winding posture. In this second position (contact position), the end surface of the rear end portion 51c extends downward in front of the front end surface of the braking member 65 and slightly inward from the outer peripheral surface thereof.

The switching member 52 is made of a synthetic resin, such as a polyamide resin or polyacetal, and as shown in FIGS. 5 and 6, it is detachably mounted on the flange 2d at a portion which separates the reel body 2a from the lid member 2b. A rectangular cut-out 53 is formed on the portion where the reel body 2a and the lid member 2b are separated from each other. The switching member 52 includes a cone-shaped cam portion 60 having two oblique surfaces 60a, 60b, a neck portion 61 integrally formed with the cam portion 60, and a brim portion 62. The downstream side in the line-winding direction (shown by the arrow in FIG. 6) of the oblique surface 60a projects forward toward the rotor 3 more than the upstream side thereof does. The degree to which the oblique surface 60b protrudes diminishes from the upstream side protruding portion of the oblique surface 60a toward the downstream side in the line-winding direction. A projecting tip 60c is the highest forward projecting point of the oblique surfaces 60a, 60b, and the amount of forward protrusion of the projecting tip 60c is set such that the toggle spring mechanism 50 passes its dead point of the toggle spring mechanism 50 when the rear end portion 51c of the moving member 51 contacts the oblique surface 60a and pushes the bail arm 17 toward the line-winding posture.

The neck portion 61 is of a size that can be fitted into the cut-out 53, and a gap that is approximately the same dimension as the wall thickness of the flange portion 2d is formed between the cam portion 60 and the brim portion 62. The brim portion 62 has a larger cross-section than the neck portion 61, and contacts the rear surface of the flange portion 2d. When the oblique surface 60b is provided and the bail arm 17 is in the line-releasing posture, even if the rotor 3 is forced to rotate in reverse (rotation in the line release direction) and the moving member 51 contacts the switching member 52, the moving member 51 of the bail tripping mechanism 18 is guided smoothly by the oblique surface 60b of the switching member 52. Thus, the moving member 51 is not easily damaged. Note that this type of switching member 52 having the two inclined surfaces 60a, 60b may able be adapted in a switching portion formed integrally with the reel unit 2.

When the lid member 2b is attached to the reel body 2a, the switching member 52 can be fixedly attached to the reel body 2a, for example, simply by fitting the neck portion 61 into the cut-out 53 on the side of the reel body 2a and fastening the lid member 2b on the reel body 2a with screws.

Rotor Braking Device

The rotor braking device 54 serves to brake the rotor 3 when the bail arm 17 pivots to the line-releasing posture, and includes the moving member 51, the braking member 65 mounted on the mounting groove 2f formed on the base end side of the cylindrical portion 2e, and a restricting mechanism 85 formed on an inner periphery of the braking member 65 and an outer periphery of the mounting groove 2f. In other words, the moving member 51 is not only part of the bail tripping mechanism 18, but also part of the rotor braking device 54.

The braking member 65 is provided in order to generate a braking force with the rotation of the rotor 3 by frictionally sliding against the moving member 51 when the bail arm 17 is in the line-releasing posture. The braking member 65 is an elastic ring member made of a synthetic rubber, such as styrene-butadiene rubber (SBR), acrylonitrile-butadiene rubber, butadiene rubber, isoprene rubber, chloroprene rubber, silicone rubber or urethane rubber.

Figure 10:
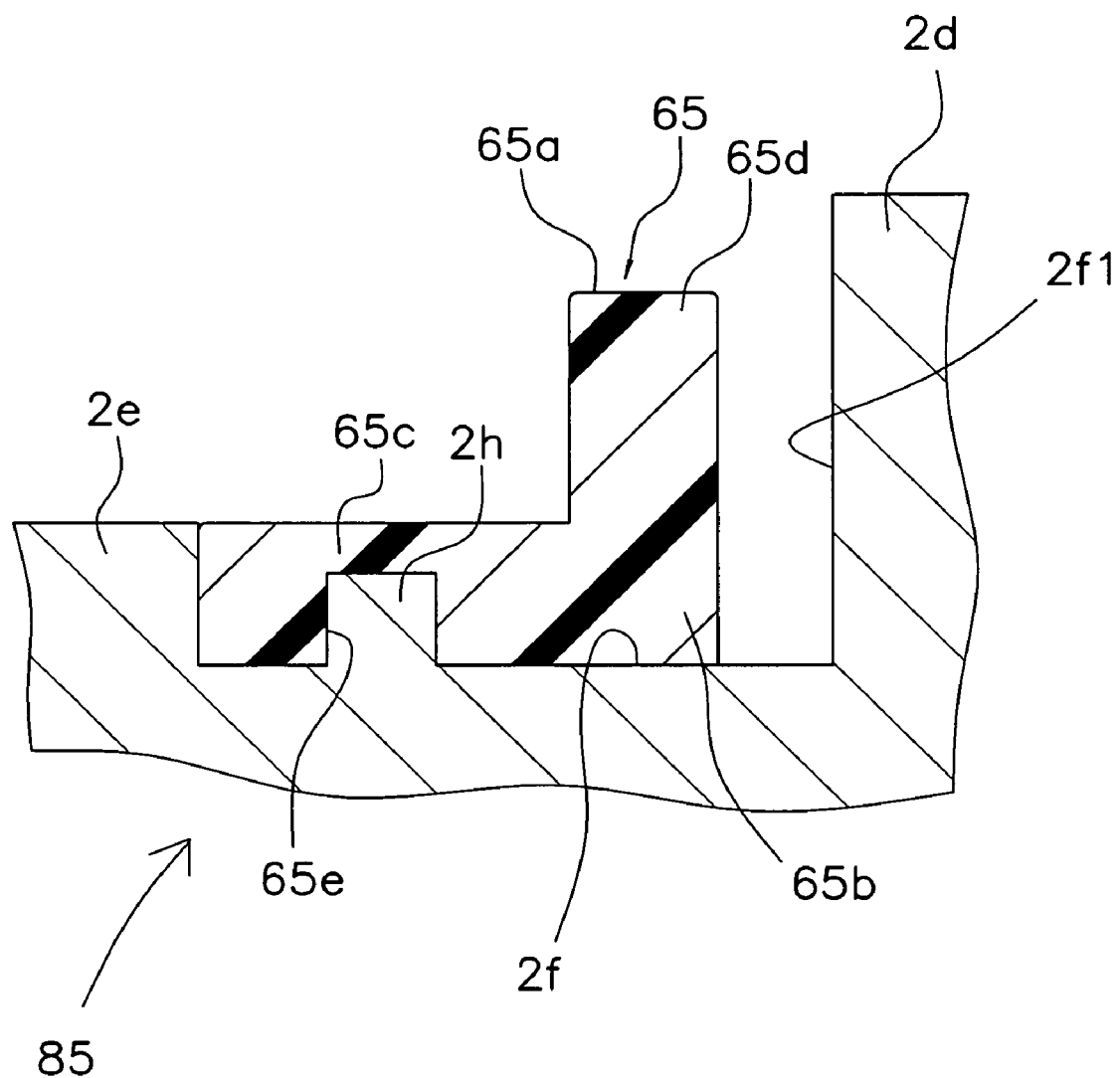
FIG. 10 is an enlarged cross sectional view of the area around the braking member of the spinning reel in accordance with the embodiment of the present invention.

As shown enlarged in FIG. 10, the braking member 65 includes a drag portion 65a against which the rear end portion 51c of the moving member 51 frictionally slides and an annular portion 65b that is mounted to the mounting groove 2f. The annular portion 65b of the braking member 65 has a substantially L-shaped cross-section, and includes a first annular portion 65c and a second annular portion 65d. The first annular portion 65c is formed in the front part of the braking member 65. The second annular portion 65d is formed in the rear part of the braking member 65 with a larger diameter than the first annular portion 65c. In this embodiment, the rear end portion 51c of the moving member 51 slides against the second annular portion 65d. Thus, the drag portion 65a is formed on the outer periphery of the second annular portion 65d. Furthermore, an interlocking groove 65e is formed on the inner periphery side of the braking member 65, and an interlocking protrusion 2h that can interlock with the interlocking groove 65e is formed so as to be coupled to the outer periphery of the mounting groove 2f. Thus, the interlocking groove 65e and the interlocking protrusion 2h constitute the restriction mechanism 85. Here, by interlocking the interlocking groove 65e formed on the inner periphery side of the braking member 65 with the interlocking protrusion 2h formed on the outer periphery of the mounting groove 2f, the back and forth movement of the braking member 65 relative to the flange portion 2d is restricted so that the braking member 65 does not come into contact with the front end of the flange portion 2d, which is the rear end of the mounting groove 2f.

Figure 7:
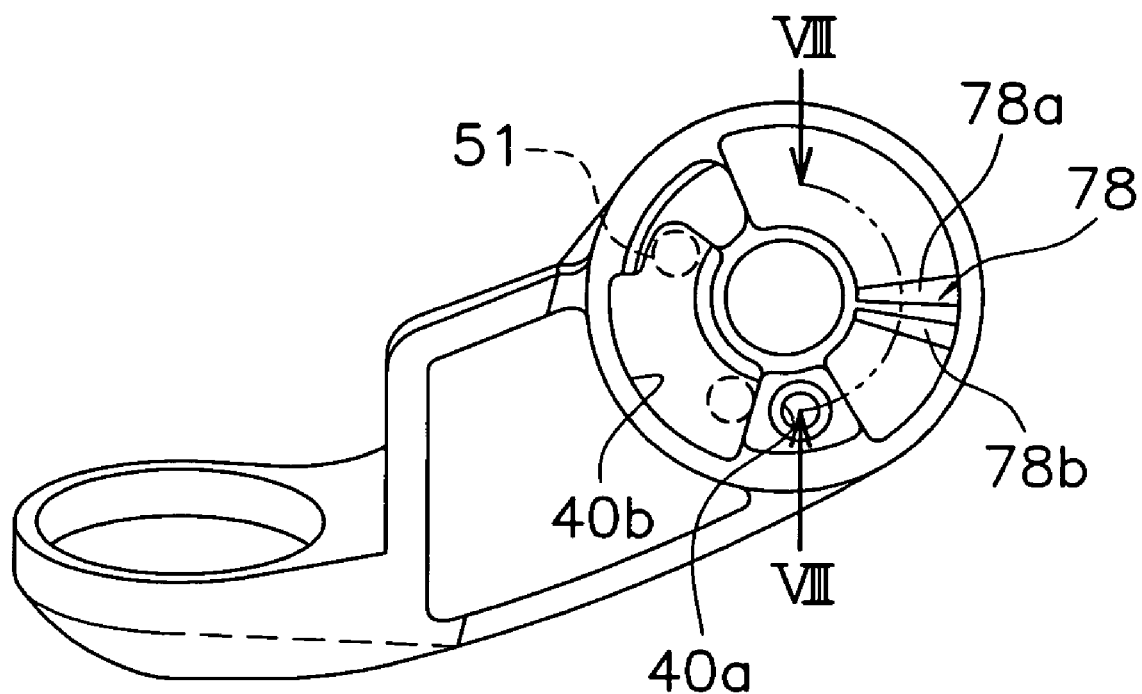
FIG. 7 is a sectional view of the first bail support member of the spinning reel in accordance with the embodiment of the present invention.
Figure 8:
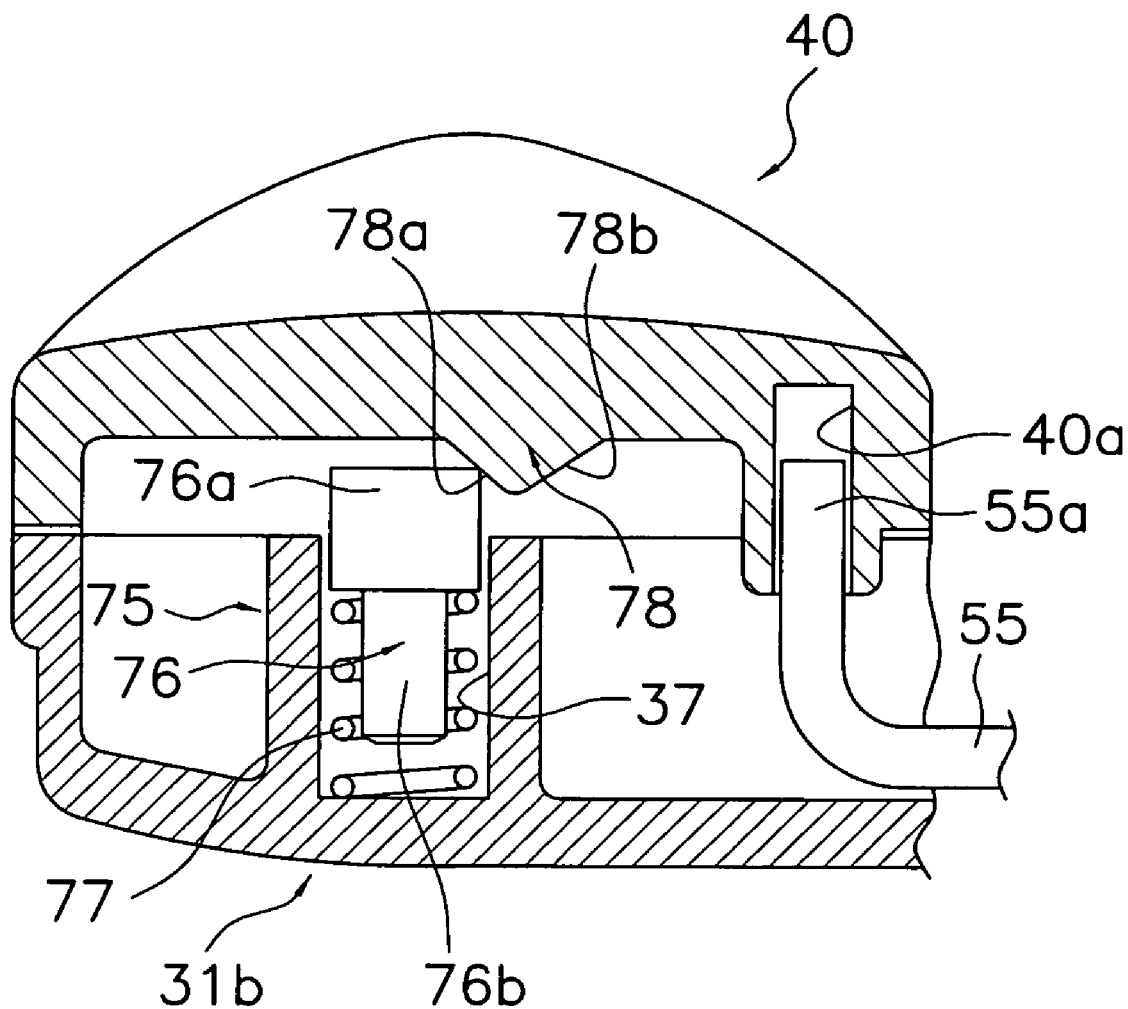
FIG. 8 is a cross-sectional view of the first bail support member of the spinning reel in accordance with the embodiment of the present invention, viewed along line VIII—VIII in FIG. 7.

The timing mechanism 75 is provided between the opposing portions of the bail arm 17 and the first arm portion 31b of the rotor 3. This mechanism restricts the bail arm 17 from returning to the line-winding posture when the bail arm 17 is disposed in the line-releasing posture, and releases this restriction when the bail arm 17 pivots to the line-winding posture before the rear end portion 51c of the moving member 51 reaches the projecting tip 60c of the oblique surface 60a. As shown in FIGS. 7 and 8, the timing mechanism 75 includes a restriction pin 76 that is mounted in the mounting hole 37 of the first arm portion 31b, a coil spring 77 that urges the restriction pin 76 toward the bail arm 17, and a pushing portion 78 that is provided on the first bail support member 40.

Figure 9:
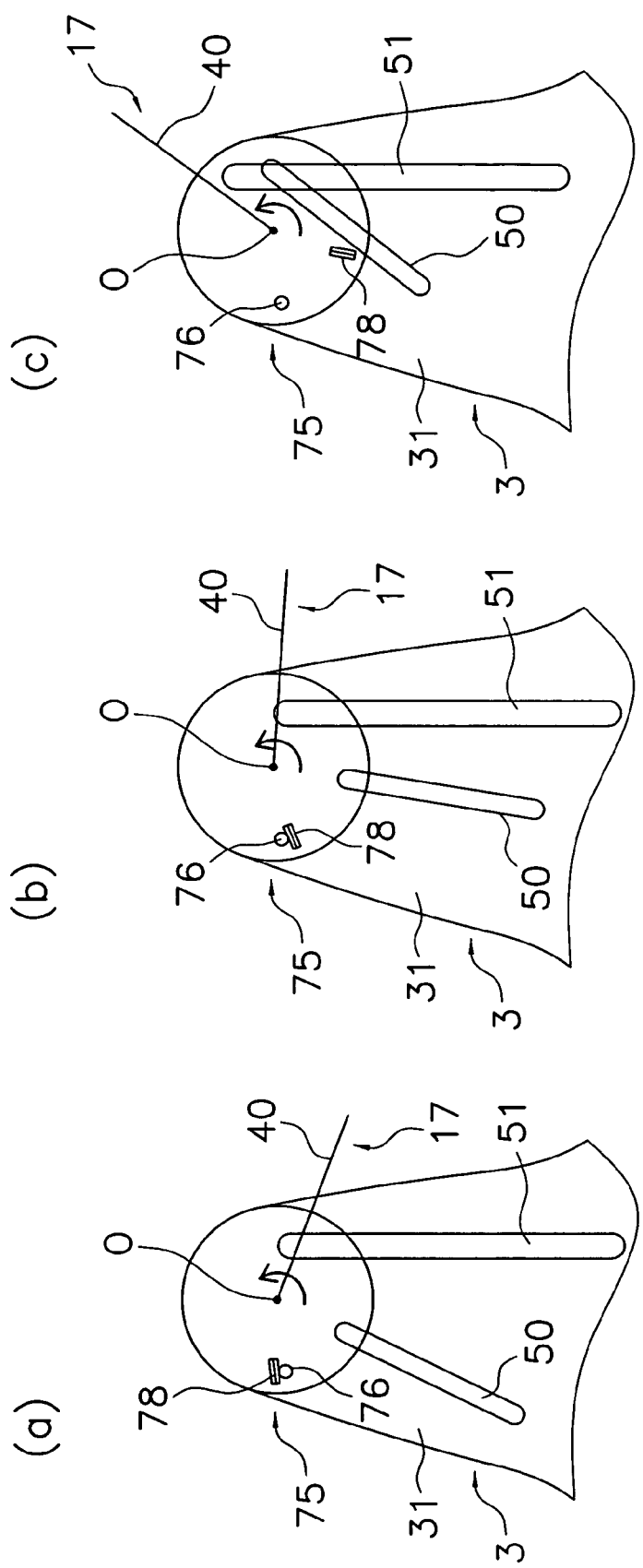
FIG. 9 is a schematic view of the spinning reel in accordance with the embodiment of the present invention showing the changes in the restriction state as the bail arm is pivoted.

The restriction pin 76 is a metal pin having a large diameter contact portion 76a and a small diameter spring mounting portion 76b. A front end of the coil spring 77 contacts the stepped portion between the contact portion 76a and the spring mounting portion 76b. The coil spring 77 is disposed around the outer periphery of the spring mounting portion 76b, and urges the restriction pin 76 toward the first bail support member 40. The pushing portion 78 has two oblique surfaces 78a, 78b, and is formed to project toward the first arm portion 31b. When pivoted from the line-releasing posture to the line-winding posture, the pushing portion 78 is positioned such that the restriction pin 76 can pass over the pushing portion 78 and release the restriction before the rear end portion 51c of the moving member 51 reaches the projecting tip 60c of the oblique surface 60a. More specifically, as shown in FIG. 9(a), the pushing portion 78 is positioned upstream from the restriction pin 76 (the pivot direction toward the line-winding posture shown by the arrow) when in the line-releasing posture, and as shown in FIG. 9(b), is positioned to pass over the restriction pin 76 before the toggle spring mechanism 50 reaches the dead point while pivoting to the line-winding posture.

In the bail tripping device 18 configured in this manner, the toggle spring mechanism 50 can be toggled between a first position shown in FIG. 3(a) and a second position shown in FIG. 3(b). The first position corresponds to the line-winding posture of the bail arm 17, whereas the second position corresponds to the line-releasing posture of the bail arm 17. Furthermore, the rear end portion 51c of the moving member 51 is guided by the guide groove 36 and can move back and forth between the first position (withdrawn position) shown in FIG. 3(a) and the second position (contact position) shown in FIG. 3(b). The first position (withdrawn position) corresponds to the line-winding posture, whereas the second position (contact position) corresponds to the line-releasing posture. In the second position (contact position), the end surface of the rear end portion 51c of the moving member 51 contacts the front surface of the braking member 65, so that the drag portion 65a is slightly compressed. Therefore, even if the position of the member 51 when in the second position (contact position) fluctuates in the axial direction, the braking force will not change.

In addition, in the second position (contact position), when the rotor 3 is rotated with the handle 1 in the line-winding direction, the rear end portion 51c of the moving member 51 strikes the oblique surface 60a of the switching member 52 and rotates. Then the moving member 51 is pushed forward toward the first position (withdrawn position), and the bail arm 17 returns to the line-winding posture when the toggle spring mechanism 50 exceeds the dead point. At this time, the restriction due to the restriction pin 76 of the timing mechanism 75 is released before the toggle spring mechanism 50 passes its dead point.

As shown in FIG. 2, a reverse rotation check mechanism 70 for blocking and releasing the reverse rotation of the rotor 3 is disposed inside the cylindrical portion 30 of the rotor 3. The reverse rotation check mechanism 70 has a roller-type one-way clutch and blocks or allows reverse rotation of rotor 3 by switching the one-way clutch between an operating state and a non-operating state.

The spool 4 is arranged between the first rotor arm 31 and the second rotor arm 32 of the rotor 3, and is disposed at the front end of the spool shaft 15 with the drag mechanism 71 interposed between the spool shaft 15 and the spool 4. The spool 4 includes a bobbin portion 4a onto the outer peripherally of which fishing line is wound, a skirt portion 4b formed unitarily with the rear part of the bobbin portion 4a, and a flange portion 4c formed unitarily with the front end of the bobbin portion 4a.

Operation of the Reel

Next, the handling and operation of the reel will be described.

When casting, the reverse rotation check mechanism 70 blocks the reverse rotation of the rotor 3, and the bail arm 17 is grasped by hand and tripped into the line-releasing posture. When the bail arm 17 is tripped into the line-releasing posture, the first bail support member 40 and the second bail support member 42 flip over backwards, and the bail tripping mechanism 18 takes up the second position shown in FIG. 3(b). Then, in the timing mechanism 75, the pushing portion 78 passes over the restriction pin 76 when the dead point of the toggle spring mechanism 50 is reached. When the bail arm 17 is flipped into the line-releasing posture, fishing line can be easily reeled out from the spool 4.

When pivoting from this line-winding posture to the line-releasing posture, the rotation of the first bail support member 40 causes the rod 55 to pivot in the counterclockwise direction in FIG. 3(a), such that the toggle spring mechanism 50 retreats gradually and then reaches the second position shown in FIG. 3(b). In this situation, the rod 55 retreats until it passes the dead point. When the rod 55 passes the dead point, the urging force of the coil spring 57 pushes the rod 55 out and switches the bail arm 17 to the line-releasing posture and the same posture is maintained. When the rod 55 passes the dead point, the pushing portion 78 of the timing mechanism 75 also passes the restriction pin 76 and restricts the bail arm 17 from pivoting to the line-winding posture, and at a point where the pushing portion 78 has passed over the restriction pin 76, the restriction pin 76 will rapidly strike the first bail support member 40 and generate a sound.

As the bail arm 17 pivots to the line-releasing posture, the moving member 51 shifts from the withdrawn position to the contact position, and the tip of the rear end portion 51c of the moving member 51 comes into elastic contact with the braking member 65. Consequently, the rotor 3 is braked and its rotational phase is maintained. However, the rotor 3 is braked only through friction generated by elastic contact with the braking member 65, thus its rotational phase may be easily adjusted simply by turning the rotor 3 by hand or by the handle 1 and so on. In other words, the frictional force brakes the rotor 3 and its rotational phase is maintained, and thus the rotor 3 does not rotate when the bail arm 17 is in the line-releasing posture.

In this state, the fishing rod is cast while grasping the fishing line with the index finger of the hand with which the fishing rod is held. Thus, the fishing line is released with high momentum due to the weight of the tackle. As noted above, movement of the bail arm 17 is restricted by the timing mechanism 75, thus making it difficult for the bail arm 17 to return from the line-releasing posture to the line-winding posture. More specifically, as shown in FIG. 9(a), because the restriction pin 76 is positioned at a point where the pushing portion 78 has passed over the restriction pin 76 and therefore disturbs the movement of the bail arm 17, it becomes difficult for the bail arm 17 to flip over around the pivotal center O due to inertial force.

After casting, for example when the handle 1 is rotated with a left hand in the line-winding direction while the bail arm 17 is still maintained in the line-releasing posture, the rotor 3 is rotated by the rotor drive mechanism 5 in the line-winding direction. When the rotor 3 rotates in the line-winding direction, the bail arm 17 returns from the bail tripping device 18 to the line-winding posture.

More specifically, in FIGS. 5 and 6, the moving member 51 turns clockwise together with the rotor 3. The rear end portion 51c of the moving member 51 then comes into contact with the oblique surface 60a of the switching member 52 fixedly attached to the reel unit 2. This pushes the moving member 51 frontward, switching it into the first position (withdrawn position) indicated by the dashed line shown in FIG. 6, and pivots the first bail support member 40 into the line-winding posture. The rod 55 of the toggle spring mechanism 50 then pivots from the second position shown in FIG. 3(b) to the first position shown in FIG. 3(a). Then, when the toggle-spring mechanism 50 passes the dead point before reaching the projecting tip 60c of the oblique surface 60a, the urging force of the coil spring 57 pushes the rod 55 out, and both switches the bail arm 17 into the line-winding posture and maintains this posture. The resistance from the restraining mechanism 75 is broken before the dead point of the toggle-spring mechanism 50 is reached. More specifically, as shown in FIG. 9(b), the pushing portion 78 passes over the restriction pin 76 and the restriction due to the pushing portion is released before the toggle spring mechanism 50 reaches the dead point, where the toggle spring mechanism 50 is disposed on the line connecting the pivotal center O and the rear end of the toggle spring mechanism 50. Therefore the bail arm 17 can be returned to the line-winding posture without intensifying the urging force of the toggle-spring mechanism 50. When the bail arm 17 is restored to the line-winding posture, the first bail support member 40 and the second bail support member 42 are both in an upright position extending forward, as shown in FIGS. 1 and 2. When the bail arm 17 returns to the line-winding posture, the fishing line is guided to the spool 4 by the bail arm 17, and wrapped onto the outer periphery of the spool 4.

With this type of rotor braking device 54, by interlocking the interlocking groove 65e formed on the inner periphery side of the braking member 65 with the interlocking protrusion 2h formed on the outer periphery of the mounting groove 2f, the back and forth movement of the braking member 65 is restricted so that the braking member 65 does not come into contact with the front end of the flange portion 2d that is the rear end of the mounting groove 2f. Here, since the braking member 65 does not come into contact with the front end of the flange portion 2d, even if a very small stepped portion is created at a joint 2g (see FIGS. 5 and 6) between the reel body 2a and the lid member 2b at the front end of the flange 2d, it will be difficult for the braking member 65 to come into contact with the very small stepped portion. Accordingly, a predetermined braking force can be obtained, and the braking force can be stabilized because the braking member 65 will no longer move and the braking force will no longer change.

Other Embodiments

Referring now to FIGS. 11–15, a rotor braking device in accordance with alternative embodiments will now be explained. In view of the similarity between the first and alternative embodiments, the parts of the alternative embodiments that are identical to the parts of the first embodiment will be given the same reference numerals as the parts of the first embodiment. Moreover, the descriptions of the parts of the alternative embodiments that are identical to the parts of the first embodiment may be omitted for the sake of brevity.

(a) In the aforementioned embodiment, a front drag type of spinning reel was used as an example. However, the present invention can be applied to the bail tripping device of all types of spinning reels that restore a bail arm to the line-winding position, such as a rear drag type spinning reel or a lever brake type spinning reel.

(b) In the aforementioned embodiment, the moving member 51 was made of a metal wire, but material from which the moving member is made is not limited thereto, and any configuration is suitable, as long as the rear end portion of the moving member can move back and forth and contact the braking surface of the braking member.

Figure 11:
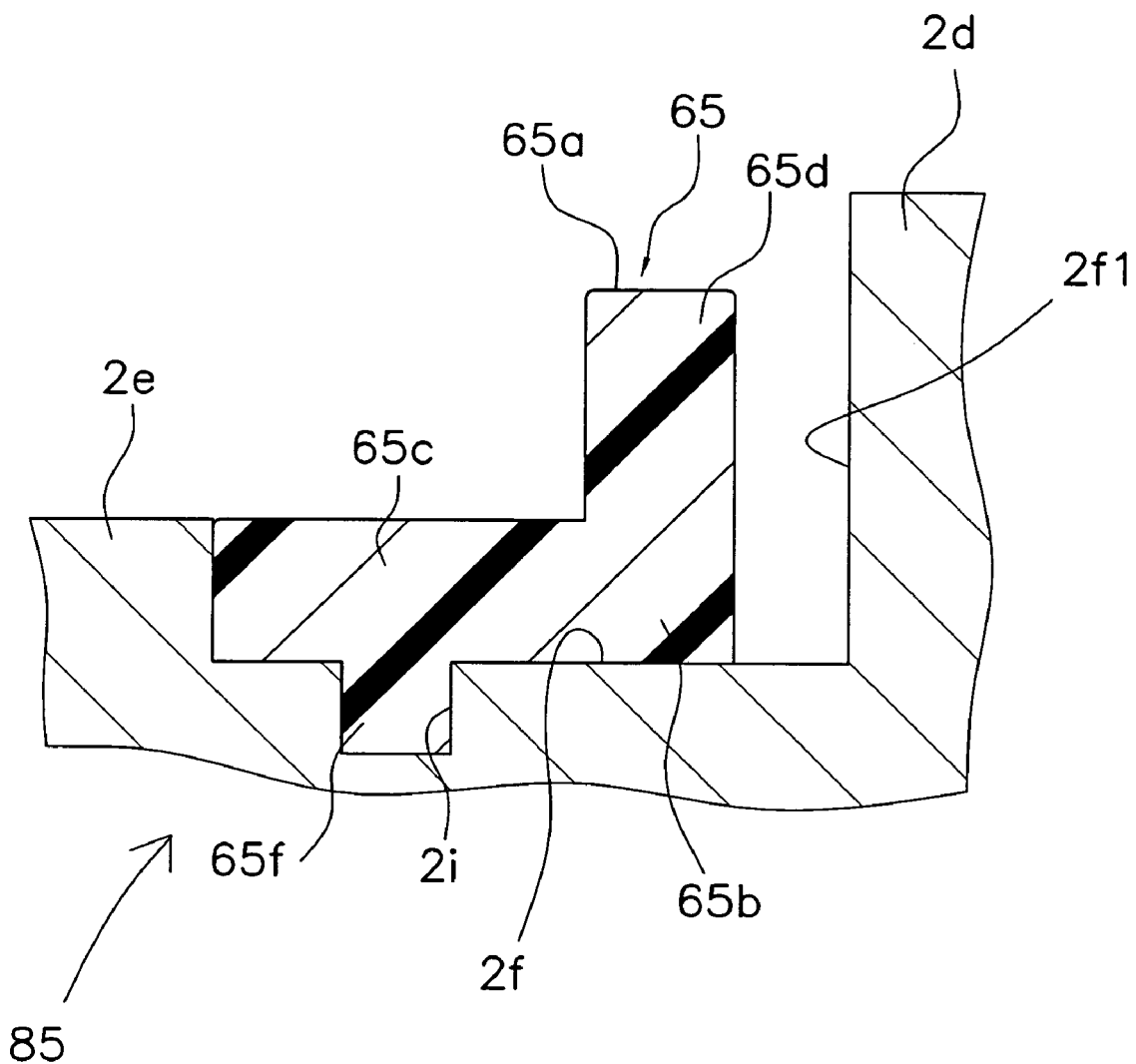
FIG. 11 is an enlarged cross sectional view corresponding to FIG. 10 of the area around the braking member of the spinning reel in accordance with a first alternate embodiment of the present invention.

(c) The aforementioned embodiment includes the interlocking groove 65e that is formed on the inner periphery side of the braking member 65 and the interlocking protrusion 2h that is formed on the outer periphery side of the mounting groove 2f that can interlock with the interlocking groove 65e, but as shown in FIG. 11, it can also be configured to include an interlocking protrusion 65f that is formed on the inner periphery of the braking member 65 and an interlocking groove 2i that is formed on the outer periphery of the mounting groove 2f and with which the interlocking protrusion 65f can interlock.

(d) In the aforementioned embodiment, the rear end portion 51c of the moving member 51 directly contacts with the braking member 65, but as shown in FIGS. 12 to 15, it can also be frictionally engaged with between a braking member 165 and a mounting groove 102f.

Figure 12:
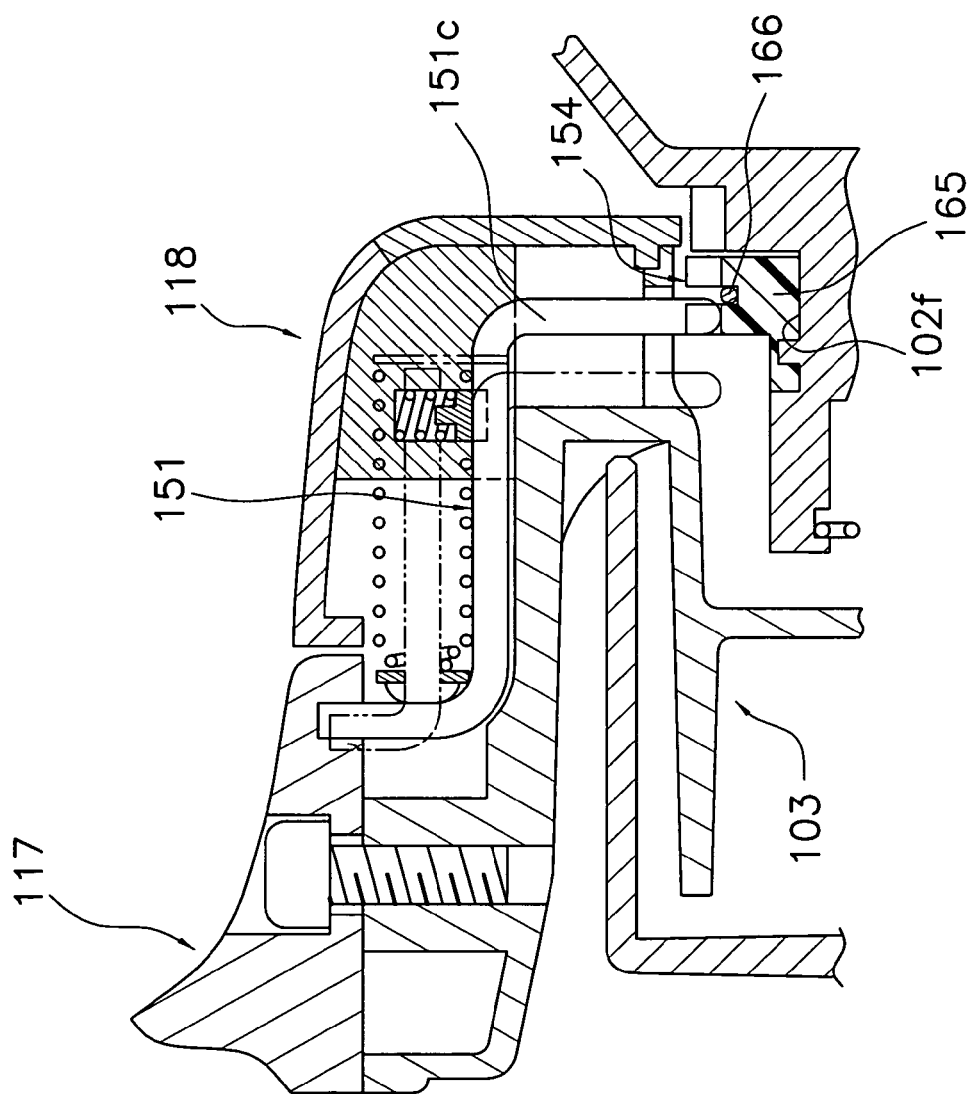
FIG. 12 is an enlarged cross-sectional view corresponding to FIG. 4 of the first rotor arm of the spinning reel in accordance with a second alternate embodiment of the present invention.
Figure 13:
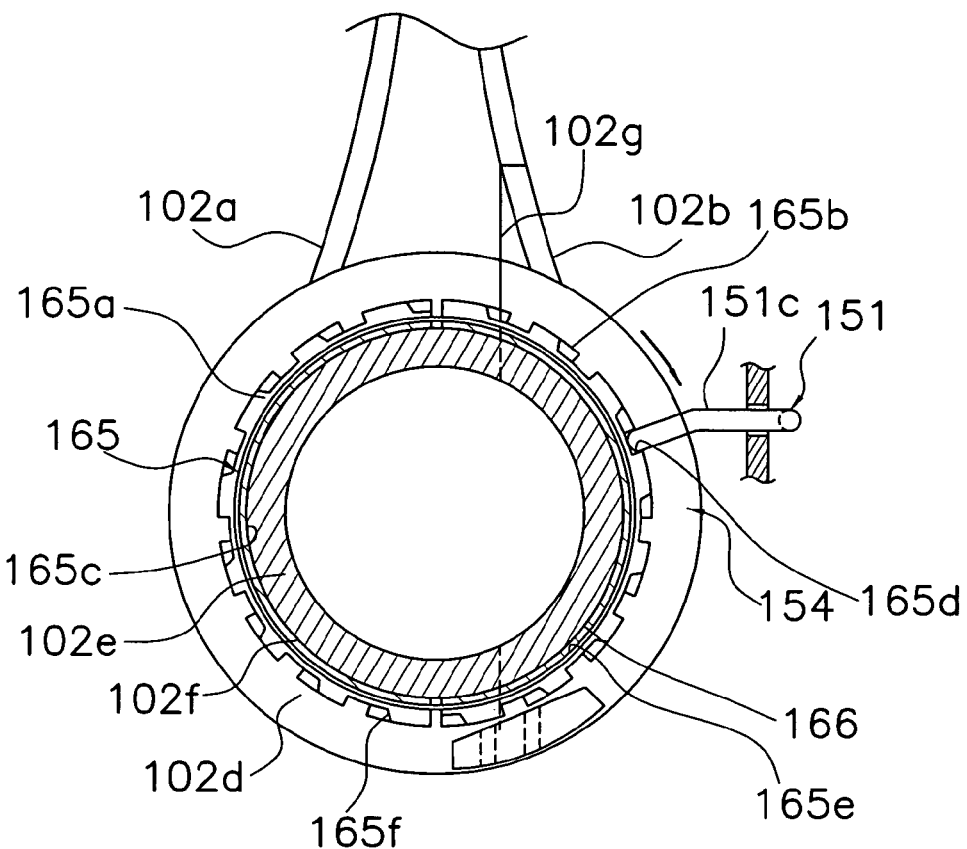
FIG. 13 is a front view corresponding to FIG. 5 of the reel body, showing the bail tripping mechanism of the spinning reel in accordance with the second alternate embodiment of the present invention.
Figure 14:
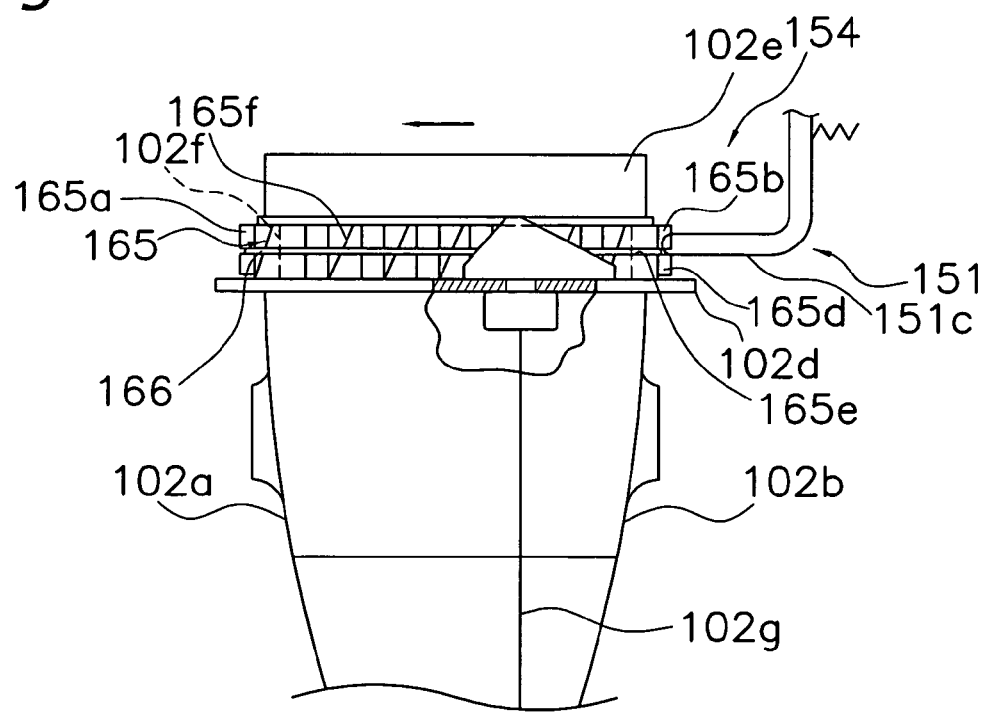
FIG. 14 is a partial bottom view corresponding to FIG. 6 of the reel body showing the bail tripping mechanism of the spinning reel in accordance with the second alternate embodiment of the present invention.

As shown in FIGS. 12 to 14, a rotor braking mechanism 154 serves to brake a rotor 103 when a bail arm 117 pivots to the line-releasing posture, and includes a moving member 151 and the braking member 165 mounted on the mounting groove 102f formed on a base end of a cylindrical portion 102e. In other words, the moving member 151 is not only part of a bail tripping mechanism 118, but also part of the rotor braking mechanism 154.

The braking member 165 is provided in order to brake the rotation of a rotor 103 when the bail arm 117 is in the line-releasing posture. The braking member 165 is composed of two members, an approximately semi-circular first braking member component 165a and a second braking member component 165b, and is made of a hard resin such as poly acetal. The first braking member component 165a and the second braking member component 165b are press fitted to the circular mounting groove 102f by a spring member 166 mounted on a groove 165e formed on the outer periphery of the The braking member 165 includes a drag portion 165c that frictionally engages with the mounting groove 102f and allows rotation, and a plurality of engaging portions 165d which are a plurality of concavities formed on the outer peripheral surface of the braking member 165 and with which a rear end portion 151c of the moving member 151 engages. The engaging portions 165d are disposed spaced apart on the outer periphery of the braking member 165, such that the rear end portion 151c engages with them. Furthermore, tapered portions 165f that incline toward the engaging portions 165d are formed at a plurality of locations on the braking member 165. The tapered portions 165f are oblique surfaces that are formed to guide the rear end portion 151c to the engaging portions 165d.

Figure 15:
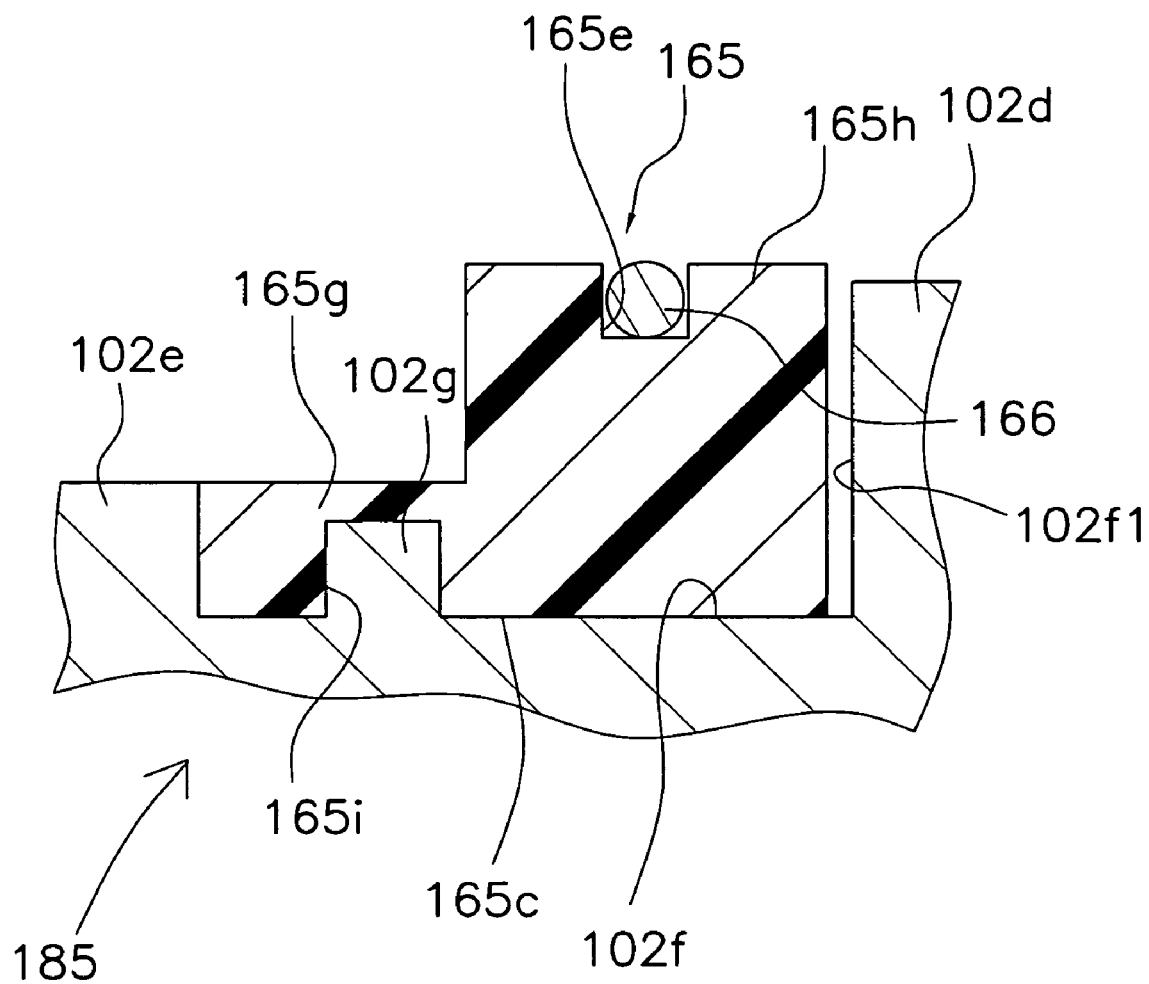
FIG. 15 is an enlarged cross sectional view corresponding to FIG. 10 of the area around the braking member of the spinning reel in accordance with the second alternate embodiment of the present invention.

As shown enlarged in FIG. 15, the braking member 165 having a substantially L-shaped cross-section includes the drag portion 165c on the inner periphery thereof, the first annular member 165g formed on the front side thereof, and the second annular member 165h formed on the rear side thereof with a larger diameter than the first annular member 165g. Furthermore, a restricting mechanism 185 includes an interlocking groove 165i formed on the inner periphery side of the braking member 165, and an interlocking protrusion 102g that can interlock with the interlocking groove 165i and is formed on the outer periphery of the mounting groove 102f. The restricting mechanism 185 further includes a spring member 166 mounted to a groove 165e formed on the outer periphery of the braking member 165. Here, by interlocking the interlocking groove 165i formed on the inner periphery side of the braking member 165 with the interlocking protrusion 102g formed on the outer periphery of the mounting groove 102f, the back and forth movement of the braking member 165 is restricted so that the braking member 165 does not come into contact with the front end of the flange portion 102d that is the rear end of the mounting groove 102f.

The spring member 166 is a wire-shaped member that is mounted to the groove portion 165e formed on the side outer periphery of the braking member 165, and has elastic force that urges in an inward direction. Note that, although not shown in the figures, a notch is formed in a portion of the spring member 166 in order to be mounted to the braking member 165.

With this type of rotor braking device 154, when the bail arm 117 pivots from the line-winding posture to the line-releasing posture, the rear end portion 151c of the moving member 151 provided on the rotor 103 engages with engaging portions 165d of the braking member 165, such that the braking member 165 rotates together with the rotor 103. When the braking member 165 rotates together with the rotor 103, the rotor 103 is braked because the drag portion 165c frictionally engages with the mounting groove 102f. Here, because the drag portion 165c frictionally engages with the mounting groove 102f so that it can rotate, the rotor is not braked only on one portion as in the prior art, but is uniformly braked over the entire drag portion, thus the braking force can be stabilized.

Here, by interlocking the interlocking groove 165i formed on the inner periphery side of the braking member 165 with the interlocking protrusion 102g formed on the outer periphery of the mounting groove 102f, the back and forth movement of the braking member 165 is restricted so that the braking member 165 does not come into contact with the front end of the flange portion 102d that is the rear end of the mounting groove 102f. Accordingly, a predetermined braking force can be obtained and thus the braking force can be stabilized because the braking member 165 does not move in the back and forth direction and the braking force does not fluctuate.

According to the present invention, a rotor braking device for a spinning reel has a restriction mechanism that restricts back and forth movement of a braking member so that the braking member does not come into contact with the rear end of a mounting groove, and thus the braking force can be stabilized.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-168744. The entire disclosure of Japanese Patent Application No. 2003-168744 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spinning reel rotor braking device for braking a rotor that is rotatably mounted on a reel unit in accordance with a pivot of a bail arm that is pivotable between a line-winding posture and a line releasing posture, the reel unit having a mounting groove on an outer periphery of a front end portion thereof, the spinning reel rotor braking device comprising:

a moving member that is provided on the rotor and movable between a first position and a second position as the bail arm moves between the line-winding posture and the line releasing posture, the first position corresponding to the line-winding posture and the second position corresponding to the line-releasing posture, the moving member having a protruding portion that protrudes toward the mounting groove when the moving member is in the second position;

a braking member that is mounted on the mounting groove of the reel unit, the braking member having a drag portion that generates a braking force by frictionally sliding against one of the reel unit and the protruding portion of the moving member when the moving member is in the second position; and a restriction mechanism that is formed on an inner periphery of the braking member and on an outer periphery of the mounting groove, the restriction mechanism restricting backward movement of the braking member relative to the reel unit so that the braking member does not come into contact with a rear end portion of the mounting groove.

2. The spinning reel rotor braking device according to claim 1, wherein the braking member further includes an engaging portion that unrotatably engages with the protruding portion of the moving member when the moving member is moved to the second position, and the drag portion frictionally slides against the mounting groove of the reel unit when the protruding portion of the moving member engages with the engaging portion.

3. The spinning reel rotor braking device according to claim 2, wherein the engaging portion includes a plurality of concavities formed on an outer periphery of the braking member.

4. The spinning reel rotor braking device according to claim 3, wherein the braking member further includes a tapered portion that includes an oblique surface to guide the protruding portion to the engaging portion.

5. The spinning reel rotor braking device according to claim 1, wherein the drag portion frictionally slides against the protruding portion of the moving member when the moving member is in the second position.

6. The spinning reel rotor braking device according to claim 1, wherein the braking member includes a first annular portion that is formed on a front side of the braking member, and a second annular portion that is larger in diameter than the first annular portion and formed on a rear side of the braking member.

7. The spinning reel rotor braking device according to claim 1, wherein the restriction mechanism includes an interlocking groove that is formed on an inner periphery of the braking member, and an interlocking protrusion that is formed on an outer periphery of the mounting groove, the interlocking protrusion interlocking with the interlocking groove.

8. The spinning reel rotor braking device according to claim 1, wherein the restriction mechanism includes an interlocking groove that is formed on the outer periphery of the mounting groove and an interlocking protrusion that is formed on an inner periphery of the braking member, the interlocking protrusion interlocking with the interlocking groove.

9. The spinning reel rotor braking device according to claim 6, wherein the drag portion is formed at the second annular portion and frictionally slides against the protruding portion of the moving member when the moving member is in the second position.

10. The spinning reel rotor braking device according to claim 1, further comprising a spring member, the braking member having a groove formed on its outer periphery, such that the spring member is mounted to the groove of the braking member.

11. The spinning reel rotor braking device according to claim 10, wherein the braking member has two semi-circular braking member components.

12. A spinning reel, comprising:

a handle;

a reel unit that rotatably supports the handle and has a mounting groove on an outer periphery of a front end portion thereof;

a rotor rotatively supported on a front of the reel unit, the rotor having a bail arm that is pivotable between a line-winding posture and a line releasing posture;

a spool arranged at a front of the rotor so as to be shiftable back and forth, the spool being for winding fishing line around its outer peripheral surface; and a rotor braking device for braking the rotor in accordance with the pivot of the bail arm, the rotor braking device including a moving member that is provided on the rotor and movable between a first position and a second position as the bail arm moves between the line-winding posture and the line releasing posture, the first position corresponding to the line-winding posture and the second position corresponding to the line-releasing posture, the moving member having a protruding portion that protrudes toward the mounting groove when the moving member is in the second position;

a braking member that is mounted on the mounting groove of the reel unit, the braking member having a drag portion that generates a braking force by frictionally sliding against one of the reel unit and the protruding portion of the moving member when the moving member is in the second position; and a restriction mechanism that is formed on an inner periphery of the braking member and on an outer periphery of the mounting groove, the restriction mechanism restricting backward movement of the braking member relative to the reel unit so that the braking member does not come into contact with a rear end portion of the mounting groove.

13. The spinning reel according to claim 12, wherein the braking member further includes an engaging portion that unrotatably engages with the protruding portion of the moving member when the moving member is moved to the second position, and the drag portion frictionally slides against the mounting groove of the reel unit when the protruding portion of the moving member engages with the engaging portion.

14. The spinning reel according to claim 13, wherein the engaging portion includes a plurality of concavities formed on an outer periphery of the braking member.

15. The spinning reel according to claim 14, wherein the braking member further includes a tapered portion that includes an oblique surface to guide the protruding portion to the engaging portion.

16. The spinning reel according to claim 12, wherein the drag portion frictionally slides against the protruding portion of the moving member when the moving member is in the second position.

17. The spinning reel according to claim 12, wherein the braking member includes a first annular portion that is formed on a front side of the braking member, and a second annular portion that is larger in diameter than the first annular portion and formed on a rear side of the braking member.

18. The spinning reel according to claim 17, wherein the drag portion is formed at the second annular portion and frictionally slides against the protruding portion of the moving member when the moving member is in the second position.

19. The spinning reel according to claim 12, wherein the restriction mechanism includes an interlocking groove that is formed on an inner periphery of the braking member, and an interlocking protrusion that is formed on an outer periphery of the mounting groove, the interlocking protrusion interlocking with the interlocking groove.

20. The spinning reel according to claim 12, wherein the restriction mechanism includes an interlocking groove that is formed on the outer periphery of the mounting groove and an interlocking protrusion that is formed on an inner periphery of the braking member, the interlocking protrusion interlocking with the interlocking groove.

21. The spinning reel according to claim 12, wherein the rotor braking device further includes a spring member, and the braking member has a groove formed on its outer periphery, such that the spring member is mounted to the groove of the braking member.

22. The spinning reel according to claim 21, wherein the braking member has two semi-circular braking member components.

* * * * *